United States Patent Office 3,307,338
Patented Mar. 7, 1967

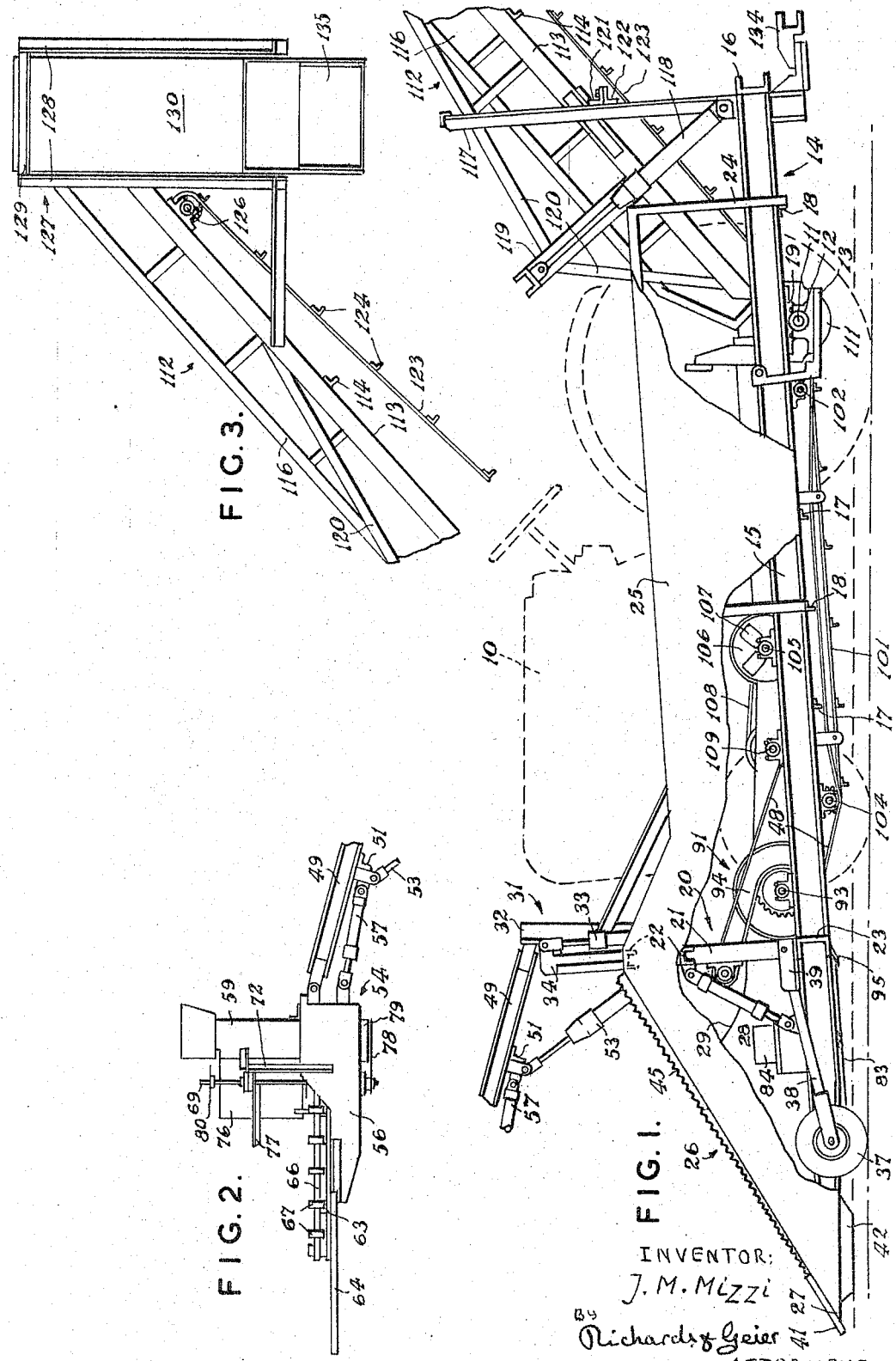

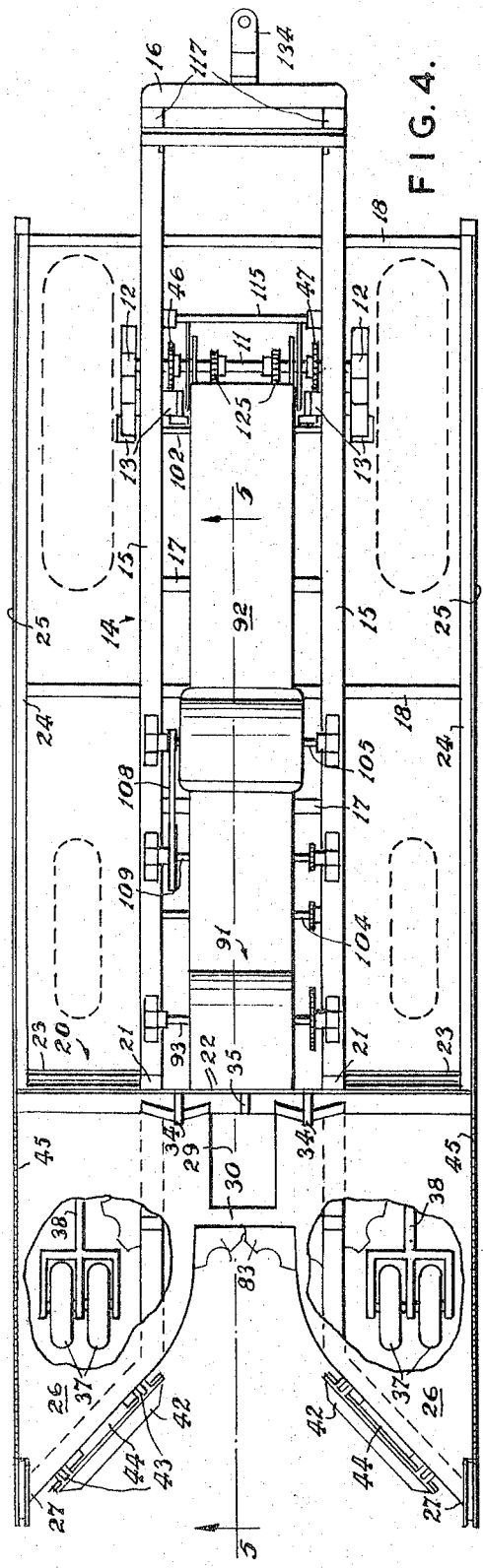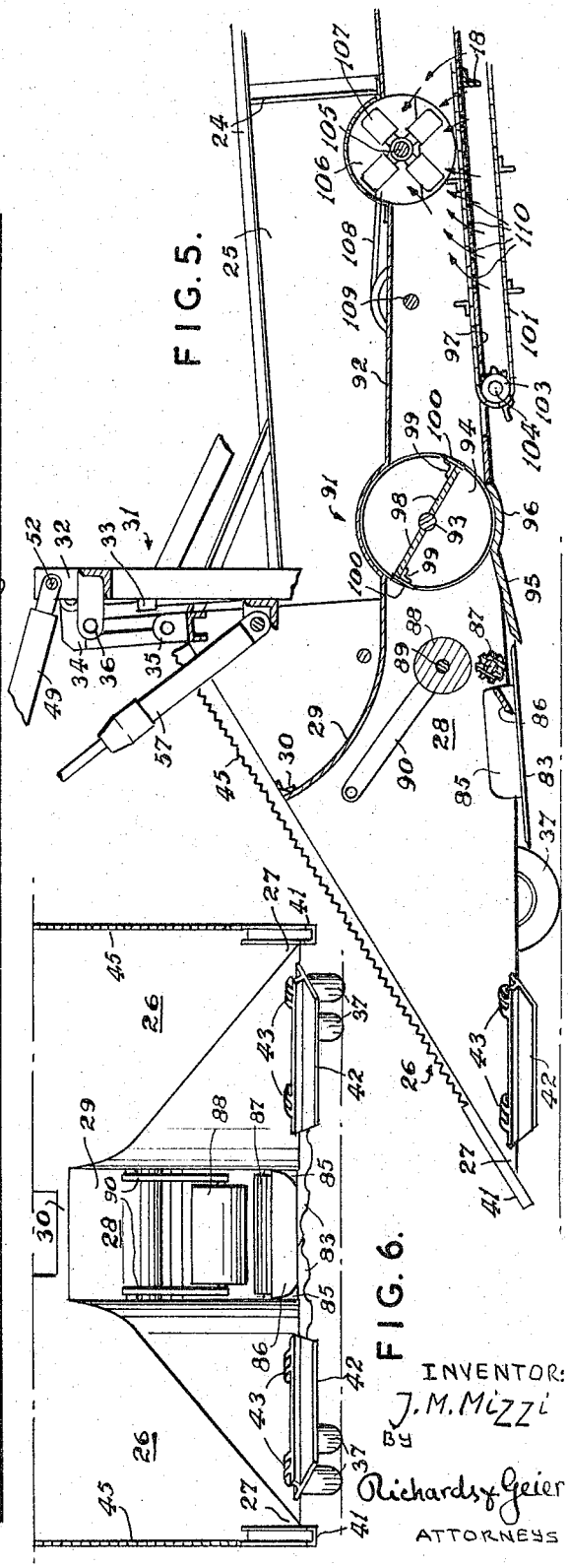

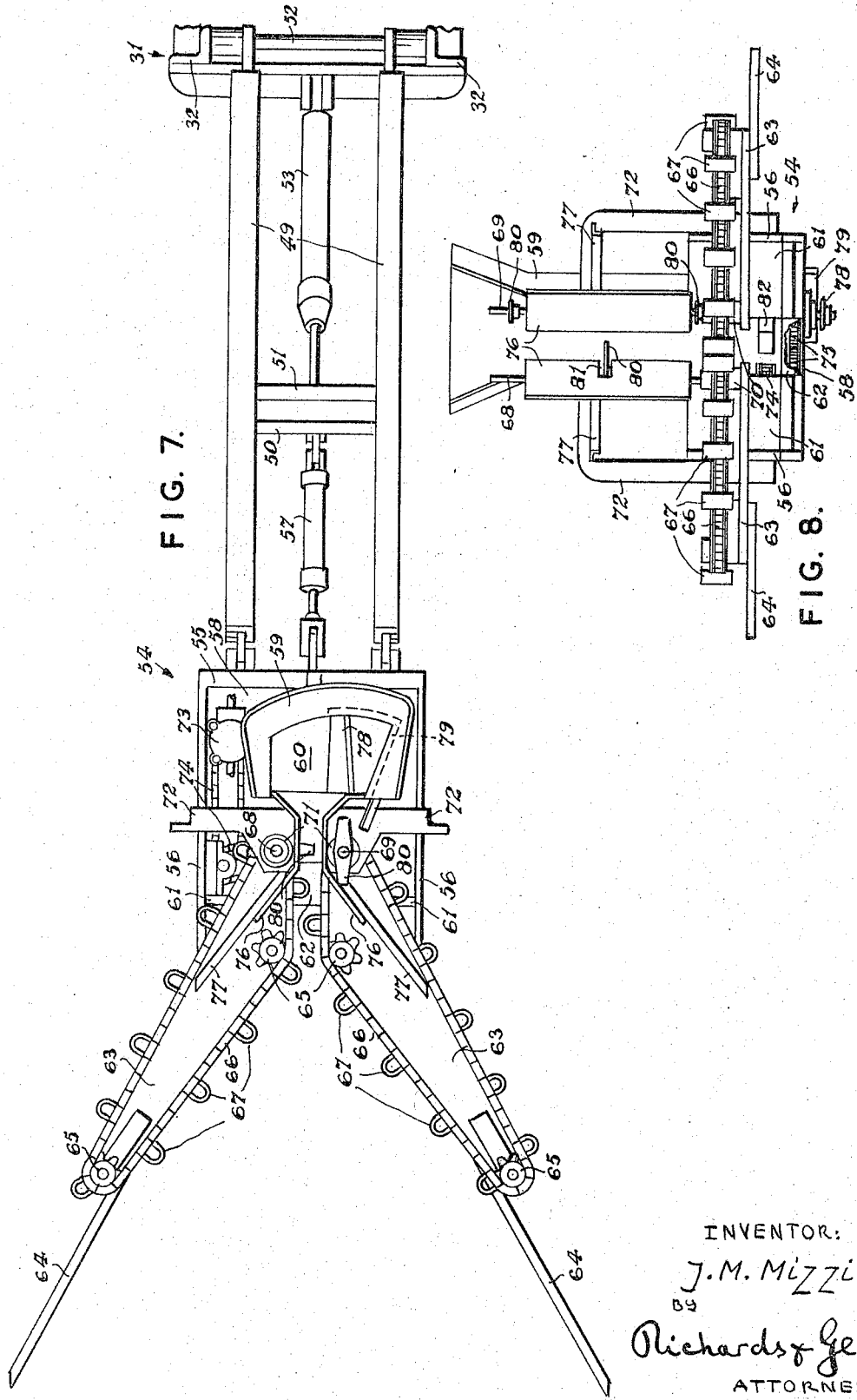

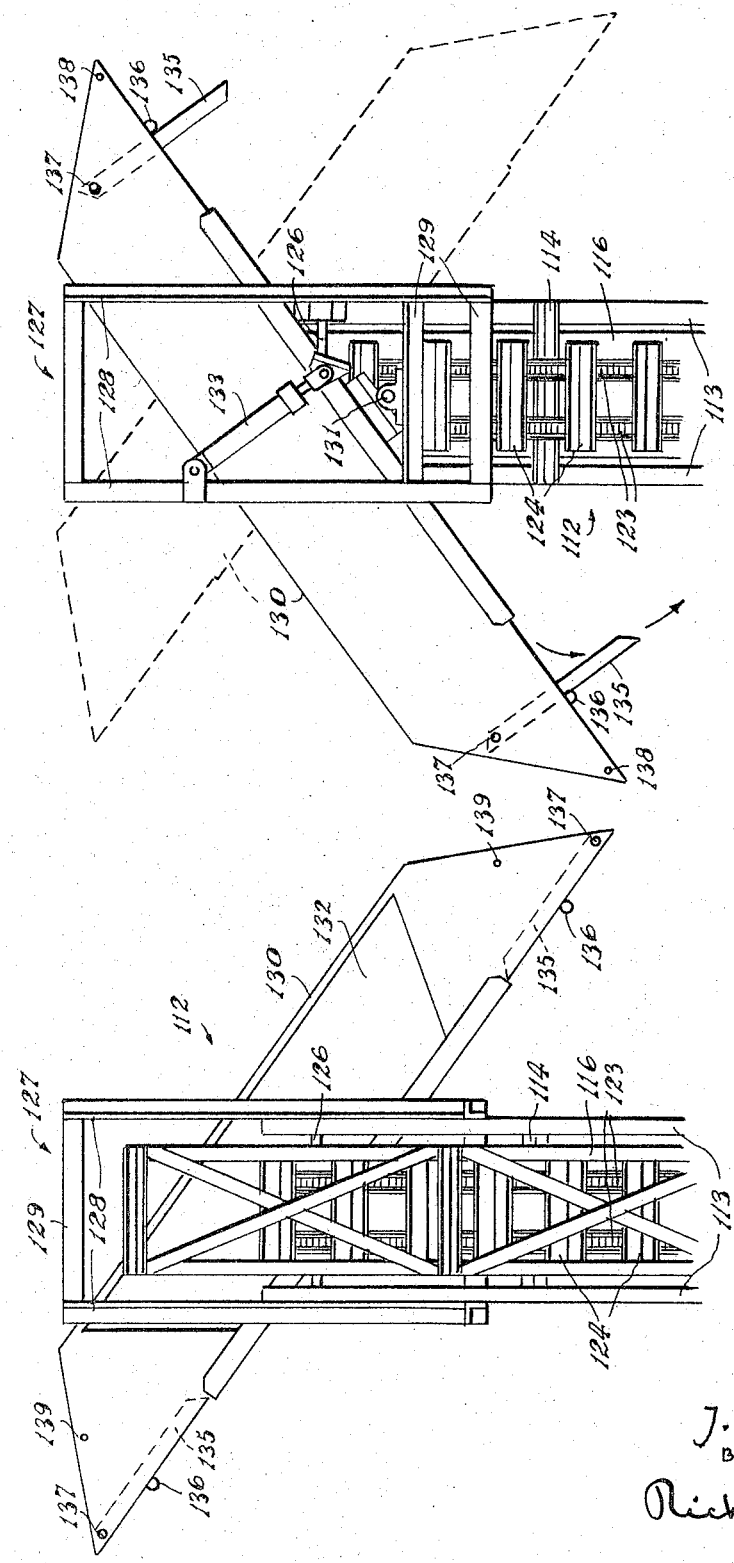

3,307,338
SUGAR-CANE HARVESTERS
Joseph Michael Mizzi, Braemeadows, near Ingham, Queensland, Australia, assignor to International Harvester Company, Chicago, Ill., a corporation of Delaware
Filed Dec. 31, 1963, Ser. No. 334,727
8 Claims. (Cl. 56—16)

This invention relates to a sugar cane harvester.

An object of the invention is to provide a sugar cane harvester which will cut cane and chop it into short lengths for delivery to a receptacle, the cane being cut directly in front of the harvester which therefore may harvest succeeding rows of a cane field, travelling in opposite directions.

In the drawings:

FIG. 1 is a partly broken-away side elevation of a cane harvester according to the invention, applied to a conventional tractor indicated in broken outline, FIG. 2 shows in side elevation the topping cutter of the harvester, omitted from FIG. 1, FIG. 3 is a side elevation of the rear part of the elevator of the harvester, omitted from FIG. 1, FIG. 4 is a partly broken-away plan view of the harvester, the topping cutter assembly and the elevator being removed, FIG. 5 is a sectional view to enlarged scale along line 5—5 in FIG. 4, FIG. 6 is a front view of the lower part of the harvester, to the same scale as FIG. 5, FIG. 7 is a plan view to enlarged scale of the topping cutter, FIG. 8 is a partly broken-away front view of the topping cutter to the same scale as FIG. 7, FIG. 9 is a front elevational view, to enlarged scale, of the rear part of the elevator, and FIG. 10 is a rear elevation of the rear part of the elevator to the same scale as FIG. 9.

The sugar cane harvester is made for attachment to a tractor, indicated in broken outline at 10. Below and behind the axle of the tractor's rear wheels is a transverse pivot counter-shaft 11, its ends being rotatable in bearings 12 on brackets 13 bolted to the rear part of the tractor.

A main frame 14 is pivoted on this shaft 11, and consists mainly of two longitudinal channel members 15, parallel except at the front where they diverge, and rigidly interconnected by a rear channel 16, by cross-members 17 and by further cross-members 18 which extend laterally beyond the longitudinal members 15. The pivot counter-shaft is rotatable in a pair of bearings 19 under the longitudinal members 15. The main frame extends forwards under the tractor 10 between its rear and front wheels, and also rearwards of the shaft 11.

The longitudinal members 15 of the main frame are interconnected by a front frame 20, consisting of a pair of uprights 21 mounted on the members 15 in front of the tractor, and interconnected at the top by two transverse channels which extend outwards of the uprights. Aligned with the uprights, two bottom channels 23 are secured to and extend outwardly from the longitudinal members 15.

At each side of the harvester a side frame 24 is mounted on the outer ends of cross-members 18 and of channels 22 and 23, and on the front ends of the divergent front parts of the longitudinal members 15. Upright and parallel side plates 25 are mounted on the side frames, being spaced by a distance somewhat less than the normal spacing between drills in a canefield. The side frames 24 and side plates 25 are such that the upper edges of the side plates, in front of the front frame 20, incline downwardly to points at the front ends of the main frame longitudinal members 15.

Ahead of the front frame 20, a pair of gathering arms 26 of sheet metal on suitable framing are built up on the main frame 15 and the side frames 24, the upper surfaces of these gathering arms inclining downwardly to the front, their inside faces being vertical, substantially parallel at the rear, and curving outwardly towards the front, to points 27 at the front ends of the main frame longitudinal members 15. Thus, the passage between the gathering arms converges rearwardly from the front widely spaced points 27 to a restricted throat 28, the top of which is defined by a top throat plate 29, commencing in front at an angle iron 30 between the upper parts of the gathering arms 26, near the rear thereof, and curving downwardly and rearwardly.

A fixed frame 31 is mounted on the front of the tractor 10 and includes a pair of braced standards 32, between the lower parts of which a pair of hydraulic rams 33 are pivoted at their lower ends. The upper ends of these rams are pivoted to the upper ends of a pair of uprights 34 secured and braced to, and extending perpendicularly up from the top of the front frame 20. These rams 33 may be operated from the tractor's hydraulic system to raise or lower the front of the main frame 14 which, pivoting about the pivot counter-shaft 11, may be lowered to working position as shown, or raised to carrying position. When the main frame is raised to carrying position, an apertured lug 35 on the top of the front frame 20 is brought between a pair of apertured lugs 36 extending forwardly from the fixed frame 31, and a locking pin (not shown) engaged in all three lugs will hold the main frame in this raised position.

When the main frame 14 is lowered to working position the gathering arms 26 are supported by two pairs of depth control wheels 37, each pair mounted in a double-forked arm 38 pivoted at its rear between a pair of parallel stabilizer brackets 39 on a channel 23. Hydraulic rams 40 are connected between the front frame 20 and the arms 38, and may be operated by the tractor's hydraulic system to raise or lower the gathering arms 26 in relation to the depth control wheels 37. The two rams 40 are hydraulically linked so that, when the harvester is advanced over rough ground, one pair of wheels 37 may be raised relative to the harvester if the other pair is correspondingly lowered. Consequently, irregularities in the ground will not result in one gathering arm being temporarily unsupported, to bring about undue stresses on the main frame 14.

To assist in lifting fallen cane, a finger 41 inclines forwardly and down from the points 27 of the gathering arms 26, and a stalk lifter 42 is mounted at the bottom of the front inside part of each gathering arm. Each stalk lifter consists of a trapezium-shaped flap hinged at 43 to its gathering arm, and having a stop 44 to limit its pivoted downward movement. Tangled cane which may tend to bind over the gathering arms 26 will be severed by a pair of fixed saws 45, each mounted along an upwardly and rearwardly inclined top outer edge of a gathering arm.

The pivot counter-shaft 11 may be driven from the usual power take-off (not shown) of the tractor by a chain drive to a sprocket 46 on this shaft. From a further sprocket 47 on this shaft, chain drives, some of which are indicated at 48, operate various mechanisms of the harvester, hereinafter described.

The harvester includes a topping cutter mounted on the fixed frame 31. A pair of parallel lifting arms 49, interconnected by a cross-member 50 and an angle-iron 51, are secured at their rear ends to a shaft 52 rotatably mounted between the tops of the standards 32, and may be raised or lowered by a hydraulic ram 53 connected between the lower part of the fixed frame 31 and the cross-member 50. The lifting arms 49 are pivoted at their front ends behind the upper part of a topping cutter frame 54, having a back plate 55 from the sides of which two parallel side plates 56 extend forwards. A hydraulic ram 57 connected between the cross-member and the lower rear part of the back plate 55 may be operated to tilt the topping cutter frame. A bottom plate 58 is fixed between the lower parts of the side plates 56. An upright chute 59, open at its front, is mounted above the rear part of the bottom plate 58, and leads down to an opening 60 through the bottom plate. A pair of supporting plates 61 are secured perpendicularly to the inside faces of the side plates 56 and to the front edge of the bottom plate 58, the supporting plates being of such length that there is a way between them. A false bottom plate 62 inclines upwardly from the front edge of the bottom plate 58, and then continues rearwardly, spaced above the bottom plate, as far as the opening 60 through the bottom plate.

The side plates 56 and supporting plates 51 support a pair of oppositely arranged but otherwise similar triangular guide arms 63, of which the inside faces converge rearwardly from widely spaced front points, and then continue rearwardly in spaced parallel arrangement over the middle of the false bottom plate 62. Rearwardly convergent guide arm extensions 64 are secured at their rear ends under the front parts of the guide arms.

Above each corner of each guide arm a sprocket 65 is rotatably mounted, the three sprockets of each guide arm being engaged by an endless chain 66 fitted with outwardly extending teeth 67. The rearmost sprockets of the two guide arms are mounted on long parallel upright shafts 68 and 69, rotatable in bearings 70 on the guide arms and in bearings 71 carried by brackets 72 secured to the side plates 56. A hydraulic motor 73 mounted in the topping cutter frame 54 may drive the shaft 68 through chain drives 74, and shaft 68 drives shaft 69 in the opposite direction by meshing gears 75 on the two shafts, between the bottom plate 58 and false bottom plate 62. The shafts 68 and 69 are so driven that the toothed chains 66, on the inside parts of their travel, move in rearwardly converging manner, and then rearwardly in fairly close parallel arrangement over the false bottom 58 and towards the open front of the chute 59.

A pair of lead-in plates 76 lead to the front opening of the chute, above the chains 66, converging rearwardly from their fairly widely spaced fronts, then continuing rearwards in parallel arrangement, then diverging rearwardly to the front opening of the chute. Lead-in arms 77 converge towards their rear ends which are secured to the fronts of the lead-in plates 76.

The shaft 69 extends below the topping cutter frame 54, and secured to its lower end is a radial topping cutter knife 78 which, when the shaft 69 is rotated, sweeps under the opening 60 through the bottom plate 58 and closely under a cutter plate 79 extending down from the last part of the opening 60 past which the knife 78 travels on each rotation of the shaft 69.

On the shafts 68 and 69 feeder blades 80 are mounted, a single blade 80 being on shaft 68, and being adapted to sweep through a slot 81 in the near lead-in plate 76, two blades 80 being on shaft 69, one just above, the other just below the associated lead-in plate 76.

On the shaft 69, below the guide arms 63, there is mounted a toothed feeder wheel 82.

As the harvester advances along a row of sugar cane to be harvested, the driver of the tractor may raise or lower the topping cutter by ram 53, and tilt the topping cutter by ram 57. Tops of cane are received between the guide arm extensions 64 and thus led to the toothed chains 66, which bring the cane tops together and rearwardly with respect to the advancing harvester. The rapidly rotating topping cutter knife 78 cuts the tops from the cane stalks, and the tops, held between the toothed chains, are carried rearwardly between the lead-in arms 77 and the lead-in plates 76. Acted on by the toothed chains 66, the rotating feeder blades 80 and the rotating feeder wheel 82, the cane tops are carried over the false bottom plate 62 and into the chute 59 when, no longer supported, they fall through the chute and, in falling, are cut into small pieces by the topping cutter knife 78. The small pieces of cane tops fall to the ground.

As the cane stalks are thus topped, the gathering arms 26 pass to either side of their butts. Fallen cane stalks are lifted by the fingers 41 and the stalk lifters 42. Tangled cane, which might otherwise tend to bind across the gathering arms, is severed by the fixed saws 45.

The cane stalks are severed at or near to ground level by a pair of ground cutters 83, consisting of scalloped coulters on the lower ends of upright shafts counter-rotated by hydraulic motors 84, one mounted within each of the gathering arms 26. The ground cutters, extending across the bottom of the throat 28, are in overlapping arrangement, and cheek plates 85 secured to the gathering arms and bearing on the upper faces of the ground cutters prevent cane from being carried under the gathering arms by these cutters. The ground cutters are so rotated that their parts in the bottom of the throat 28 sweep rearwardly, carrying the severed butts rearwards and up over a transverse ramp plate 86 to a pair of feed rollers 87 and 88. The lower roller 87 is longitudinally ribbed, and is driven clockwise with reference to FIG. 5. The upper roller 88, of larger diameter, is freely rotatable on a shaft 89 carried at one end of a pair of arms 90 pivoted at the other end to the gathering arms 26. The cane stalks, pushed over forwards by the throat plate 29 as their butts are swept rearwards and engaged between the rollers 87 and 88, are fed rearwards, butt ends first.

The cane stalks are chopped into pieces, which are thrown rearwardly, by a rotary chopping cutter indicated generally at 91, and located in the front part of a longitudinal housing 92. This housing, of rectangular cross-section, leads from the throat 28 to a position near the pivot counter-shaft 11, being supported between the channel members 15 on the cross-members 17 and 18.

The chopping cutter includes a transverse shaft 93 rotatable in bearings on the channel members 15 and driven from the pivot counter-shaft by a chain drive 48. Fixed on the shaft 93 are two parallel discs 94 which fit closely in circular holes in the front parts of the sides of the housing 92, the front part of the top of the housing being of conforming cylindrical-segmental shape.

From the rear of the ground cutters 83, a transverse butt guide plate 95 inclines upwardly towards the rear, where it meets the front edge of a chopping plate 96, arcuately curved in cross section to conform to the curvature of the lower parts of discs 94, the rear edge of the chopping plate leading to the front of the bottom plate 97 of the housing 92.

Secured to the chopping cutter shaft 93 are two diametrically opposed radiating rectangular throwing plates 98, the ends of which are secured to the discs 94. An angle iron blade mounting bracket 99 is secured across the outer edge of each throwing plate 98, and removably bolted on each of these brackets is a tangential chopping cutter blade 100. As the chopping cutter shaft 93 is rotated, each of the blades 100 sweeps downwardly to the leading edge of the chopping plate 96, and closely across this plate from front to rear. Each blade, then, cuts the longitudinally fed cane stalks into pieces, which are thrown rearwardly by the throwing plates 98.

The cane pieces thus thrown rearwardly within the housing 92 are received and carried rearwardly by a conveyor 101 consisting of endless chains interconnected by angle cleats and mounted on rear conveyor sprockets carried by a transverse shaft 102 carried by bearings under the longitudinal channels 15 near the pivot counter-shaft 11, and by front conveyor sprockets 103 on a transverse shaft 104 carried by bearings under the said channels, and driven from the pivot counter-shaft by a chain drive 48.

The conveyor 101 carries the cane pieces through a trash extractor assembly consisting of a transverse fan shaft 105 passing axially through round holes 106 in the sides of the housing, the top of which at this position is of raised cylindrical segmental shape. In each of these holes or air outlets 106, a fan 107 is mounted on the shaft 105, which is driven by a belt drive 108 from a transverse shaft 109 which in turn is driven from the pivot counter-shaft by a chain drive 48. In the vicinity of the fan assembly, the bottom plate 97 of the housing 92 is formed with a multiplicity of perforations or air inlets 110, and when the fan shaft is driven, air is drawn through these perforations, as indicated by arrows in FIG. 5, and expelled through the air outlets 106, carrying away particles of leaves and other trash.

The cleaned pieces of cane are delivered from the rear of the housing 92 into a substantially semi-cylindrical trunk 111 co-axial with the pivot counter-shaft 11, and from this trunk they are taken by an elevator indicated generally at 112.

The elevator includes a pair of parallel main members 113 interconnected by cross-members 114, and pivoted at their lower ends on an elevator pivot shaft 115 secured transversely between the main frame channels 15, near to the pivot counter-shaft 11. An elevator casing 116 is mounted between the main members 113. The main members 113 pass between a pair of stabilizer standards 117 extending perpendicularly up from the rear ends of the main frame channels 15. The elevator structure may be pivotally raised or lowered by a pair of hydraulic rams 118 connected between the rear ends of the main frame channels 15 and the tops of a pair of standards 119 extending perpendicularly from the elevator main members 113 and braced thereto by stays 120. The elevator may be supported in normal working position independently of the rams 118 by a transverse support 121 removably secured on angle brackets 122 on the two stabilizer standards 117.

A pair of endless elevator chains 123, interconnected by angle cleats 124, are mounted on a pair of front sprockets 125 on the pivot counter-shaft 11, and on a pair of rear sprockets on a shaft 126 below the rear parts of the elevator main members 113.

At the rear of the elevator is a top frame 127 of rectangular shape with four uprights 128 interconnected by various cross members 129 at front, back and sides, the main members 113 being secured and stayed to the front uprights.

A transverse tilting delivery chute 130 is fitted through the top frame 127, being centrally mounted upon a longitudinal shaft 131 rotatable in bearings at front and back of the top frame. The chute is of rectangular cross-section, open at each oblique side, and with an intake opening 132 in its front. The chute may be tilted so that one side or the other is lowered, by a hydraulic ram 133 connected between a rear upright of the top frame and the rear part of the chute, and the intake opening is so shaped that, whichever way the chute is tilted, cane pieces may be fed thereinto from the elevator casing. The cane pieces fed into the chute will be discharged gravitationally from the lower side of the chute, to one side or the other of the rear of the harvester, and may be received in a large bin mounted on wheels and drawn by another tractor. Since the harvester is capable of harvesting successive rows of cane in a cane field, travelling in alternating directions, but the bin must be drawn always at the side away from the unharvested cane, the tilt of the delivery chute is reversed at the commencement of the harvesting of each new row of cane.

Instead of the cane pieces being received in a bin drawn to one side of the rear of the harvester, the mobile bin may be drawn directly behind the harvester, being hitched to a draw-bar 134 at the rear of the main frame 14. So that the cane pieces can be directed to a bin directly behind the harvester, the bottom of the delivery chute, at each side, consists of a tray 135, hinged transversely across its middle at 136 to the chute. Each tray may be held in normal position, as shown in FIGS. 3 and 9, being flush with the fixed middle part of the chute bottom, by retaining pins 137 engaging with holes 138 at the lower sides of the chute and with the tray. Alternatively, each tray may swing through a right angle to the position shown in FIG. 10, and so held by engaging the retaining pins 137 in different holes 139 in the sides of the chute, and in the tray. When the trays are in the alternate positions, as shown in FIG. 10, cane pieces fed into the chute will descend towards the lower end thereof, fall through the opening left in the chute bottom by the re-position of the lower tray, and be deflected by the tray as indicated by the arrows in FIG. 10 so as to fall directly behind the harvester. A bin drawn behind the harvester may be loaded with cane pieces in well-trimmed manner by changing the tilt of the chute 130 from time to time, so that the cane pieces will be directed into the bin first from one side and then from the other.

The elevator, extending to the rear of the pivot counter-shaft 11, assists in counterbalancing the remainder of the harvester which extends forwardly of the pivot counter-shaft, so reducing the loading on the wheels 37 when the harvester is in operation. The centre of gravity of the harvester as a whole being fairly near to the axles of the rear drive wheels of the tractor 10, the tractor will be assured at all times of good traction, and as the longitudinal axis of the harvester is aligned with that of the tractor, there will be no tendency of the assembly to veer to one side or the other in wet or shifting soil, and it will be found that the tractor-mounted harvester may be easily handled at all times. As the harvester, drawing a bin directly behind it, may be driven directly into a cane field to harvest any selected row first, the harvester is made to suit existing cane fields, and the layouts of cane fields do not require to be modified to suit the harvester. As the topping cutter cuts the tops of cane into small pieces, these pieces may be left lying on the ground as a mulch which will not interfere with the subsequent cultivation of the soil. The suctional extraction of trash from conveyed pieces of cane ensures that the cane pieces delivered to the bin are clean and free of any undue amount of rubbish.

If the harvester has to be driven into a shed, or if for any other reason it is found to be necessary or desirable for the overall height of the harvester to be lowered, the elevator may be somewhat raised by the rams 118, to permit the supporting cross-piece 121 to be removed from its brackets 122, after which the elevator may be lowered by the rams.

Although the particular embodiment of the invention herein described will be found to be effective in achieving the objects for which the invention has been devised, it will be understood that it may be subject to many modifications of constructional detail and design which will be readily apparent to skilled persons. For example, the harvester, instead of being mounted on a conventional tractor may be applicable to any other suitable type of power driven mobile unit, which may be of such character that various parts of the harvester, notably the conveyor 101 may be at a greater inclination to horizontal when in operating position, so that the harvester will have somewhat more clearance than is achieved in the particular embodiment described.

What I claim is:

1. A cane harvester including a power-driven mobile unit; a ground cutter forward of and aligned with said mobile unit substantially at ground level to cut stalks of cane; a chopping cutter forward of and aligned with said mobile unit but rearward of said ground cutter to chop said stalks into pieces; means for feeding cut stalks to said chopping cutter; a longitudinal conveyor aligned with and extending beneath said mobile unit and discharging to the rear of it; and means for passing said pieces from said chopping cutter to the forward end of said conveyor.

2. A cane harvester as claimed in claim 1, having an upwardly-inclined elevator at the rear of said unit; and means for transferring said pieces from said conveyor to said elevator.

3. A cane harvester as claimed in claim 1, having a pair of rearwardly convergent gathering arms forward of said ground cutter.

4. A cane harvester including a power-driven mobile unit; a ground cutter forward of said mobile unit substantially at ground level to cut stalks of cane; a chopping cutter forward of said mobile unit but rearward of said ground cutter to chop said stalks into pieces; means for feeding cut stalks to said chopping cutter; a longitudinal conveyor extending beneath said mobile unit and discharging to the rear of it; means for passing said pieces from said chopping cutter to the forward end of said conveyor; a topping cutter for severing the tops of standing cane; means for mounting said topping cutter above and forward of said ground cutter; a chute rearward of said topping cutter; means for passing severed tops from said topping cutter into said chute; and means for cutting said tops into small pieces as they pass through said chute.

5. A cane harvester as claimed in claim 4, having a rotary knife which on the forward part of its travel acts as said topping cutter and on the rear part of its travel moves across said chute and acts as said means for cutting said tops into small pieces.

6. A cane harvester as claimed in claim 4, wherein said means for passing cut tops into said chute include rearwardly moving opposed chains between which said tops are held.

7. A cane harvester as claimed in claim 4, wherein said means for passing cut tops into said chute include rearwardly moving opposed chains between which said tops are held; and rotating feeder blades above said chains.

8. A cane harvester including a power-driven mobile unit; a ground cutter forward of said mobile unit substantially at ground level to cut stalks of cane; a chopping cutter forward of said mobile unit but rearward of said ground cutter to chop said stalks into pieces; means for feeding cut stalks to said chopping cutter; a longitudinal conveyor extending beneath said mobile unit and discharging to the rear of it; a housing about said longitudinal conveyor, a trash outlet formed in said housing; a fan to move trash from said housing through said outlet; and means for passing said pieces from said chopping cutter to the forward end of said conveyor.

References Cited by the Examiner

UNITED STATES PATENTS

| | | | |
|---|---|---|---|
| 1,120,977 | 12/1914 | Roosa | 56—347 |
| 1,710,611 | 4/1929 | Duncan | 56—17 |
| 2,078,379 | 4/1937 | Grayson et al. | 198—72 X |
| 2,188,522 | 1/1940 | Alfs | 56—60 |
| 2,348,634 | 5/1944 | McEachern | 56—16 |
| 2,648,943 | 8/1953 | Shafer et al. | 56—17 |
| 2,953,886 | 9/1960 | Douglas et al. | 56—16 X |
| 3,141,281 | 7/1964 | Gaunt et al. | 56—16 |

ABRAHAM G. STONE, *Primary Examiner.*

ANTONIO F. GUIDA, *Examiner.*